USO11291188B2

(12) United States Patent
Duray et al.

(10) Patent No.: US 11,291,188 B2
(45) Date of Patent: Apr. 5, 2022

(54) HORSE RIDING SADDLE COMPRISING AT LEAST ONE SENSOR

(71) Applicant: LIM FRANCE, Nontron (FR)

(72) Inventors: Laurent Duray, Bordeaux (FR); Pauline Martin, Saint Germain de Montbron (FR)

(73) Assignee: LIM FRANCE, Nontron (FR)

( * ) Notice: Subject to any disclaimer, the term of this patent is extended or adjusted under 35 U.S.C. 154(b) by 383 days.

(21) Appl. No.: 15/767,283

(22) PCT Filed: Oct. 12, 2016

(86) PCT No.: PCT/FR2016/052632
§ 371 (c)(1),
(2) Date: Apr. 10, 2018

(87) PCT Pub. No.: WO2017/064416
PCT Pub. Date: Apr. 20, 2017

(65) Prior Publication Data
US 2018/0295813 A1 Oct. 18, 2018

(30) Foreign Application Priority Data
Oct. 12, 2015 (FR) ........................................ 1559669

(51) Int. Cl.
*B68C 1/02* (2006.01)
*A01K 29/00* (2006.01)
(Continued)

(52) U.S. Cl.
CPC .............. *A01K 29/005* (2013.01); *B68C 1/00* (2013.01); *B68C 1/02* (2013.01); *B68C 1/025* (2013.01); *B68C 1/20* (2013.01)

(58) Field of Classification Search
CPC ........ A01K 29/00; A01K 29/005; B68C 1/02; B68C 1/025; B68C 1/00; B68C 1/04;
(Continued)

(56) References Cited

U.S. PATENT DOCUMENTS 3,495,751 A * 2/1970 Moran ...................... B68C 1/20
224/148.1
4,190,968 A * 3/1980 Clapp .................. A01K 15/027
434/247
(Continued)

FOREIGN PATENT DOCUMENTS

DE         10242447 A1 *  3/2004  .............. B62J 50/20
DE    102009005325 A1 *  7/2010  ................ B62J 1/02
(Continued)

OTHER PUBLICATIONS

English-language translation of Fourgeaud, WO 2012131206 A1 (Year: 2012).*
(Continued)

*Primary Examiner* — Lisa L Tsang
(74) *Attorney, Agent, or Firm* — Nixon & Vanderhye

(57) ABSTRACT

A horse riding saddle includes a saddle tree disposed in a cover, the saddle tree including an arch that forms a pommel. The saddle includes at least one sensor positioned in the saddle, close to the pommel, and connected to the saddle tree by a thorough connection under the arch of the saddle-tree, in a longitudinal and vertical plane (PMV) of the saddle-tree.

20 Claims, 4 Drawing Sheets

(51) Int. Cl.
*B68C 1/00* (2006.01)
*B68C 1/20* (2006.01)

(58) Field of Classification Search
CPC ......... B68C 1/20; A61B 5/112; A61B 5/1118; A61B 5/1121; A61B 5/1123
USPC .................... 54/44.1, 44.5; 340/573.1, 573.3
See application file for complete search history.

(56) References Cited

U.S. PATENT DOCUMENTS

| | | | | |
|---|---|---|---|---|
| 4,258,869 | A * | 3/1981 | Hilgendorff | B62J 9/00 224/429 |
| 4,478,225 | A * | 10/1984 | Ewing | A61B 5/332 600/519 |
| 4,540,001 | A * | 9/1985 | Ewing | A61B 5/0404 600/519 |
| 4,774,679 | A * | 9/1988 | Carlin | A61B 5/0002 273/454 |
| 4,879,865 | A * | 11/1989 | Van Scoyk | B68C 1/12 54/66 |
| 4,935,887 | A | 6/1990 | Abdalah | |
| 5,097,706 | A | 3/1992 | Le Nouvel et al. | |
| 6,352,053 | B1 * | 3/2002 | Records | A01K 15/02 119/712 |
| 8,398,560 | B2 * | 3/2013 | Elser | A61B 7/003 600/534 |
| 8,803,692 | B2 * | 8/2014 | Goetzl | A01K 15/021 340/573.3 |
| 8,823,524 | B2 | 9/2014 | Bradley et al. | |
| 9,355,307 | B2 | 5/2016 | Bradley et al. | |
| 10,912,496 | B2 * | 2/2021 | Yamamoto | A61B 5/6823 |
| 2005/0211177 | A1 * | 9/2005 | Bescherer | A01K 39/012 119/57.8 |
| 2006/0000420 | A1 * | 1/2006 | Martin Davies | A01K 29/005 119/174 |
| 2008/0086988 | A1 * | 4/2008 | Ruiz Diaz | B68C 1/025 54/44.3 |
| 2010/0045463 | A1 * | 2/2010 | Bradley | A61B 5/0022 340/573.1 |
| 2010/0259922 | A1 * | 10/2010 | Johnson | B68C 1/20 362/105 |
| 2011/0072768 | A1 * | 3/2011 | Wuerminghausen | B68C 1/126 54/44.5 |
| 2013/0280683 | A1 * | 10/2013 | Smith | G09B 5/00 434/247 |
| 2014/0250842 | A1 * | 9/2014 | Hennig | B68C 1/02 54/44.1 |
| 2016/0114233 | A1 * | 4/2016 | Marsh | B68C 1/00 434/247 |
| 2016/0272480 | A1 * | 9/2016 | Majjan | H02S 30/00 |
| 2017/0088208 | A1 * | 3/2017 | Ogawa | B62J 1/12 |
| 2017/0265810 | A1 * | 9/2017 | Van De Vyver | A61B 5/6833 |
| 2018/0113217 | A1 * | 4/2018 | Ruetenik | G01S 19/14 |

FOREIGN PATENT DOCUMENTS

| | | | |
|---|---|---|---|
| DE | 20 2010 000555 U1 | 2/2011 | |
| DE | 10 2009 055705 A1 | 6/2011 | |
| EP | 0 402 258 A1 | 12/1990 | |
| EP | 2921380 A1 * | 9/2015 | ............. B62J 27/00 |
| EP | 2985215 A1 * | 2/2016 | ............. B62K 25/00 |
| FR | 1248870 A * | 12/1960 | ............. B62J 1/00 |
| FR | 2 648 234 A1 | 12/1990 | |
| FR | 2 972 438 A1 | 9/2012 | |
| WO | WO-2004084624 A1 * | 10/2004 | ............. A61B 5/416 |
| WO | 2007/132245 A1 | 11/2007 | |
| WO | 2012131206 A1 | 10/2012 | |

OTHER PUBLICATIONS

International Search Report, dated Jun. 19, 2017, from corresponding PCT application No. PCT/FR2016/052632.
http://www.saddlefitting.fr/archives/2012/01/13/23238350.html Available since Jan. 13, 2012.

* cited by examiner

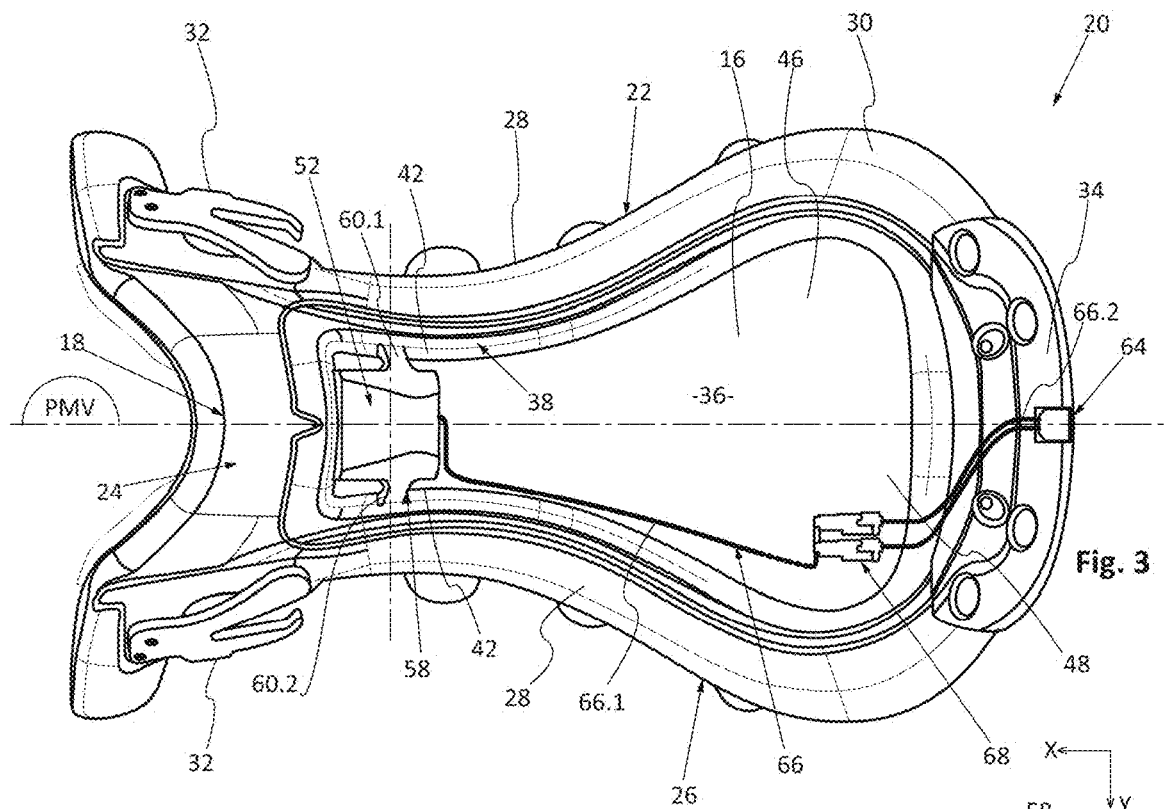
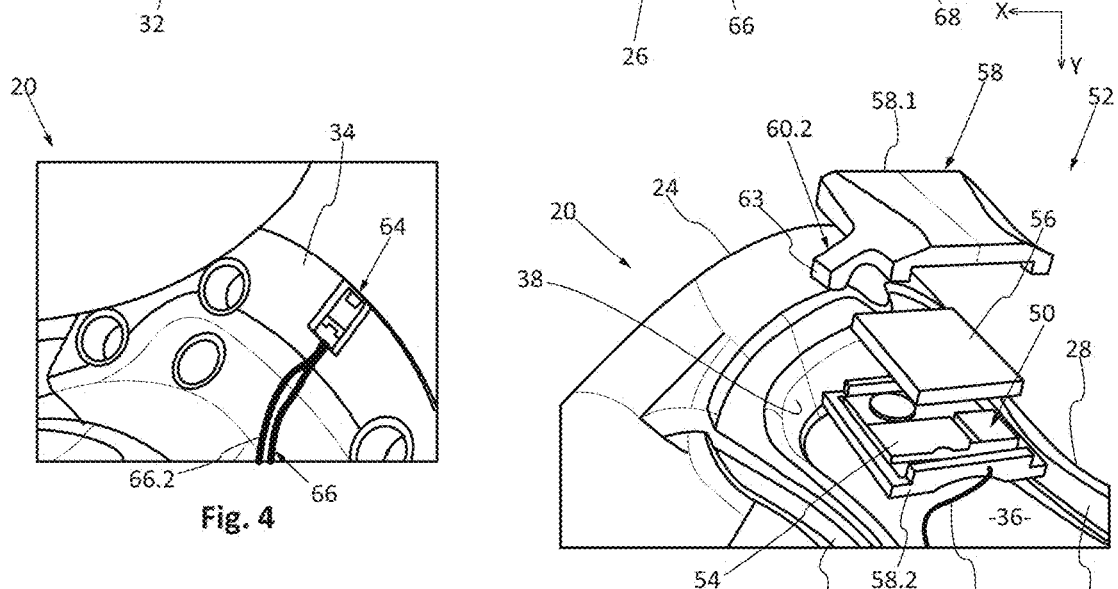
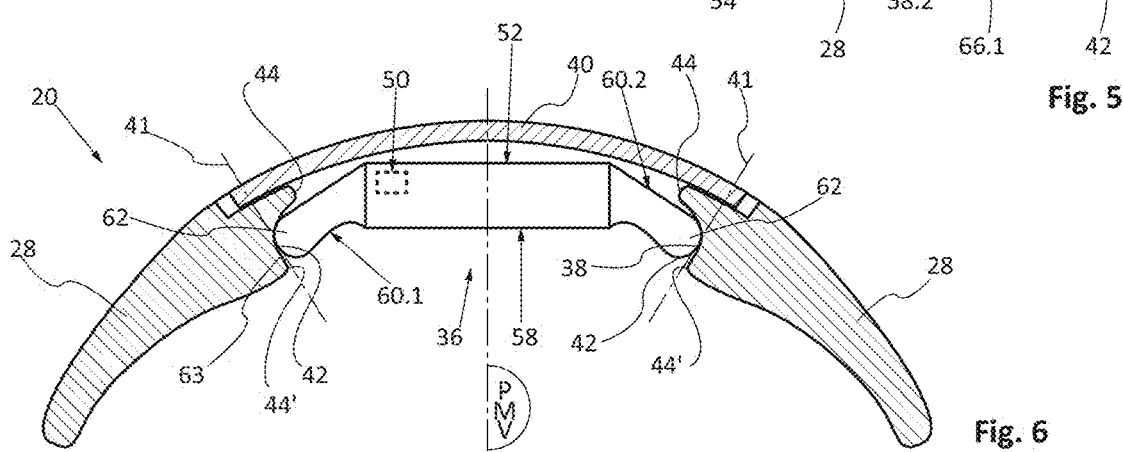

HORSE RIDING SADDLE COMPRISING AT LEAST ONE SENSOR

BACKGROUND OF THE INVENTION

Field of the Invention and Description of the Related Art

This application relates to a horse riding saddle equipped with at least one sensor. The document FR-2,648,234 describes a device for taking measurements especially designed for horses. This device comprises an inverted U-shaped support that is attached on the exterior of the saddle, at the front of the saddle-tree. For this purpose, the support comprises two slightly conical openings, designed to receive two mounting pins carried by a plate that is integral with the saddle-tree of the saddle. This support comprises sensors such as accelerometers, for example, to measure characteristics relating to the movements of the horse. This device is not completely satisfactory because the connection between the support and the saddle is not rigid, which gives rise to disturbances in the area of the measurements taken by the sensors attached to the support. Consequently, to obtain usable results, the signals coming from the sensors must be processed, which tends to complicate the method of analyzing the results.

BRIEF SUMMARY OF THE INVENTION

This invention aims to eliminate the drawbacks of the prior art.

For this purpose, the invention has as its object a horse riding saddle characterized in that it comprises at least one sensor positioned in the saddle, near the pommel and connected to the saddle-tree by a thorough connection.

According to the invention, there is no relative movement between the sensor and the saddle-tree. Thus, the measurements obtained from the sensor(s) are not disturbed by vibratory phenomena and are representative of the movements of the horse. They can be used directly, which tends to simplify the methods of analyzing said measurements.

According to an embodiment, the saddle-tree comprises an arch, a bar that has two lateral bands whose rear ends are connected by a curved rear portion that supports a cantle and whose front ends are connected to the arch, and the saddle comprises:

a fixed case containing the sensor(s) and that is attached under the arch of the saddle-tree, a removable case containing at least one means for storing electric power, a housing placed in the area of the cantle and designed to receive the removable case, at least one wire connection connecting the fixed case and the removable case that has a connector.

Advantageously, the saddle-tree comprises a rigid shell that forms the housing, and the connector comprises a first part that is integral with the rigid shell and a second part that is integral with the removable case, the first and second parts being designed to be plugged into one another automatically when the removable case is translated in an insertion direction up to an inserted state of the removable case in the housing.

BRIEF DESCRIPTION OF THE DRAWINGS

Other characteristics and advantages will emerge from the following description of the invention, a description given by way of example only, in relation to the accompanying drawings in which:

FIG. 3 is a top view of the saddle that is seen in FIG. 2, FIG. 4 is a view in perspective that illustrates a portion of the cantle of the saddle that is seen in FIG. 2, FIG. 5 is a view in perspective showing an electronic case according to an embodiment of the invention, FIG. 6 is a section of a saddle-tree that illustrates an embodiment of the assembly of an electronic case.

DETAILED DESCRIPTION OF THE PREFERRED EMBODIMENTS

Figure 1:
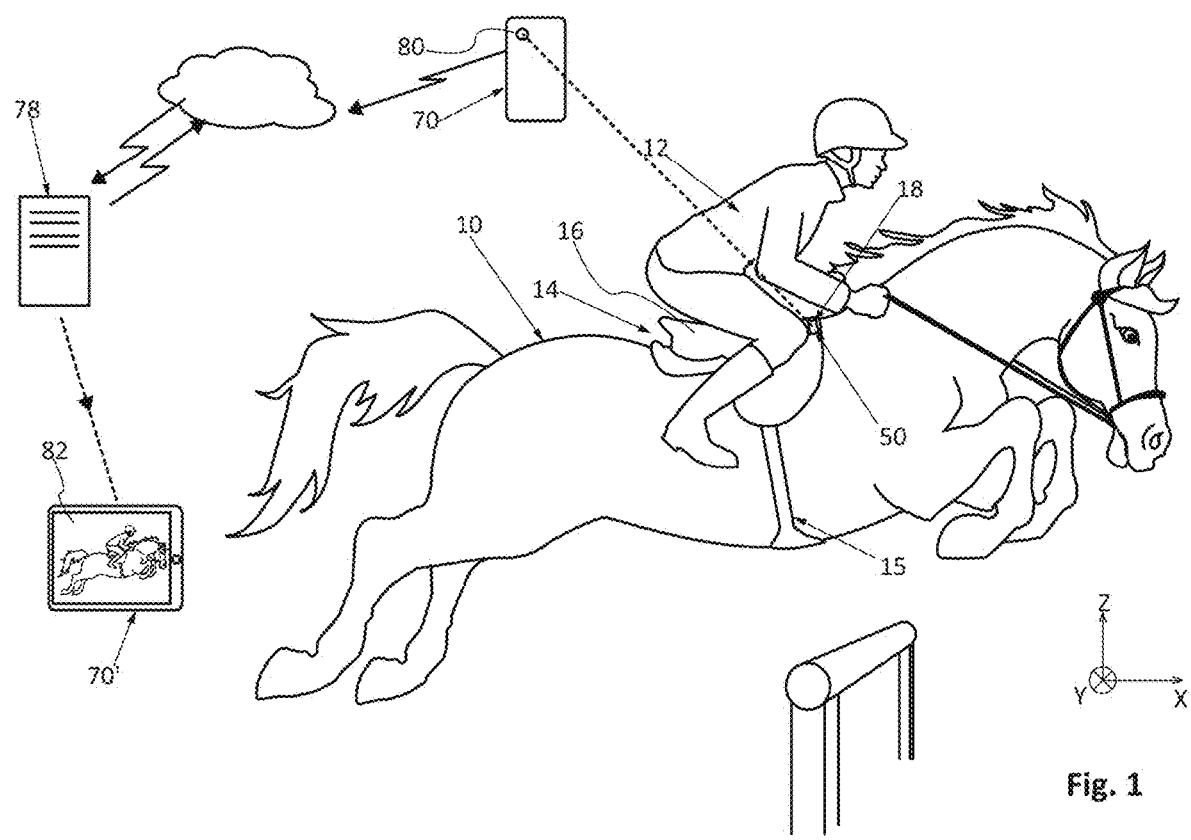
FIG. 1 is a side view of a horse equipped with a saddle that illustrates the invention.

In the various figures, represented as 10 is a horse ridden by a rider 12.

The horse 10 is equipped with a saddle 14 secured to the horse using a girth 15 that encircles the torso of the horse 10.

For the rest of the description, the axis X is a horizontal axis parallel to the direction of advance of the horse. When the horse advances in a straight line, the axis X corresponds to the axis of the spinal column of the horse. The axis Y is a horizontal axis perpendicular to the axis X. The axis Z is an axis perpendicular to the axes X and Y. The axis Z is vertical. A longitudinal direction is merged with the axis X. A longitudinal plane passes through the axis X. A transverse plane is a plane perpendicular to the axis X.

The terms "front" and "rear" applied to a part of the saddle make reference to the horse, a front part of the saddle being directed toward the head of the horse and a rear part toward the tail.

The terms "upper" and "lower" applied to a part of the saddle make reference to the direction of the saddle when it is strapped onto the horse, an upper part of the saddle being directed toward the rider and a lower part being directed toward the horse.

The saddle 14 comprises a seat 16 for the rider and a pommel 18 located at the front of the seat 16.

Structurally, the saddle 14 comprises a saddle-tree 20 and a covering that is not shown in these figures. The covering of the saddle is not further described because it is known to a person skilled in the art and can be identical to that of existing saddles.

The saddle-tree 20 is approximately symmetrical in relation to the longitudinal and vertical plane PMV.

According to an embodiment that is seen in FIGS. 2 to 6, the saddle-tree 20 comprises a frame 22 that has at the front an arch 24 that forms the pommel 18 of the saddle and at the rear a bar 26 that forms the seat 16. In a transverse plane, the arch 24 has an Omega shape. The bar 26 comprises two lateral bands 28 whose rear ends are connected by a curved rear portion 30. The front ends of the two lateral bands 28 are connected to the arch 24.

As shown in FIG. 3, the arch 24 supports two blades 32 placed symmetrically relative to the longitudinal and vertical plane PMV. The curved rear portion 30 of the bar 26 supports a cantle 34.

The arch 24 and the bar 26 form an opening 36 bounded by a peripheral edge 38.

Figure 2:
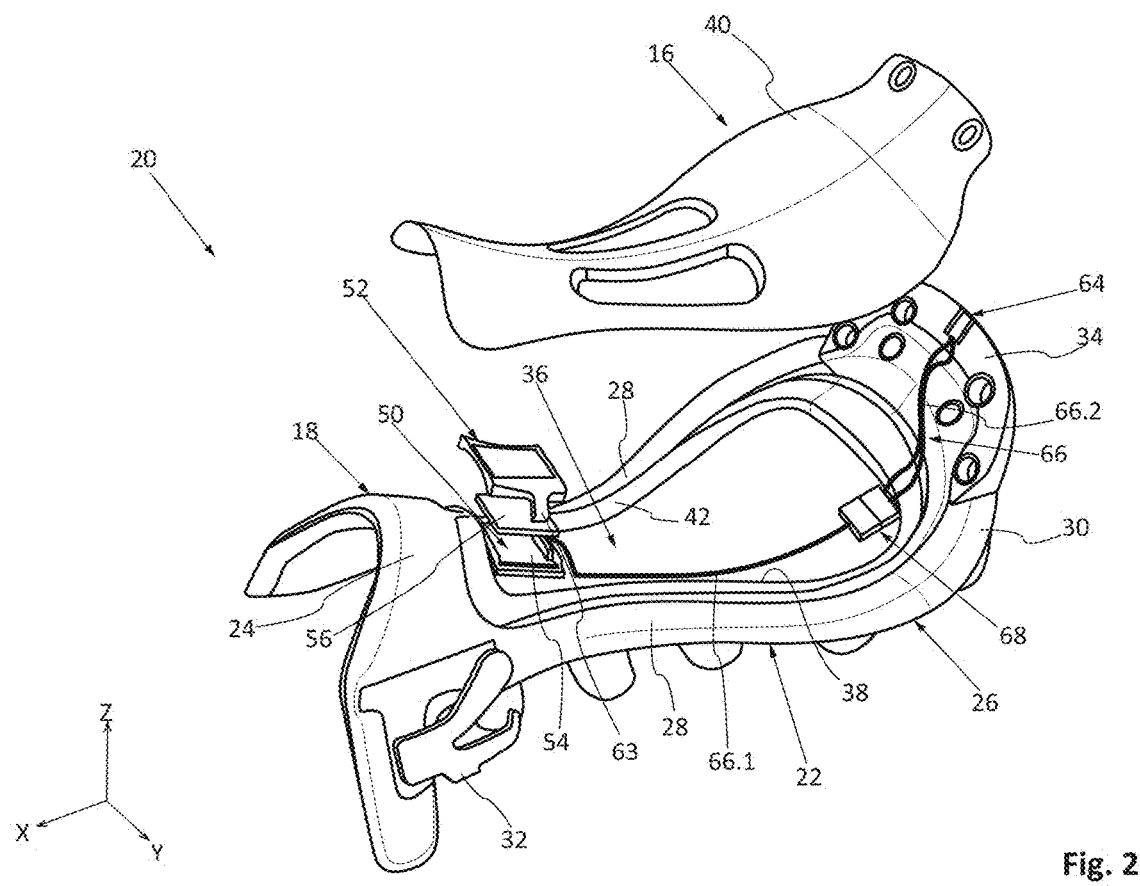
FIG. 2 is a view in perspective of a saddle equipped with an electronic case that illustrates an embodiment of the invention.

According to the embodiment that is seen in FIG. 2, the saddle-tree 20 also comprises a support 40 secured to the frame 22 by connection means 41 (which can be seen in FIG. 6).

This support 40 rests on the upper periphery of the opening 36.

Advantageously, the saddle-tree 20 is made of composite material.

The arch 24 and the bar 26 are not further described because they can be identical to those described in the document FR-2,972,438.

When the saddle 14 is strapped onto the horse 10 using the girth 16, the saddle-tree 20—and more particularly the front part of the saddle-tree 20—perfectly follows the movements of the part of the body of the horse to which they are connected.

According to a first embodiment that is seen in FIGS. 2 to 6, the peripheral edge 38 of the opening 36 comprises a concave profile 42 on at least a part of each of the lateral bands 28, as illustrated in FIG. 6.

This concave profile 42 comprises a C shape that is open toward the vertical median plane PMV with, on both sides, two bulges 44, 44', for example a first bulge 44 positioned in the area of the upper surface of the saddle-tree 20 and a second bulge 44' positioned in the area of the lower surface of the saddle-tree 20. The function of this concave profile 42 will be explained later.

According to a characteristic of the invention, the saddle 14 comprises at least one sensor 50 that is integrated into the saddle 14, positioned inside the covering of the saddle, in the vicinity of the pommel 18 and connected to the saddle-tree 20 by a thorough connection. A thorough connection is defined as the sensor 50 being immobile in relation to the saddle-tree 20. Thus, there is no relative movement between the sensor 50 and the saddle-tree 20. The sensor 50 or its support are directly connected to the saddle-tree 20 and not to the covering of the saddle. Since the front part of the saddle-tree 20 is itself essentially secured relative to the body of the horse, the sensor 50 takes measurements that are representative of the movements of the horse. According to the invention, the measurements are not disturbed by vibratory phenomena as in the case of the devices of the prior art that are mounted on the saddle and that are not connected directly to the saddle-tree of the saddle.

By way of example, the sensor(s) (50) is (are) selected from among the following sensors: accelerometer, gyroscope, tachometer, geolocating sensor, inclinometer, goniometer, inertia sensor, or the like.

The saddle 14 comprises an electronics device 52 in which the sensor(s) 50 is or are placed.

This electronics device 52 comprises at least one circuit board 54 and at least one means for storing electric power 56.

For the rest of the description, the circuit board 54 is defined as one or more circuit board(s), and the means for storing electric power 56 is defined as one or more means for storing electric power.

Advantageously, the electronics device 52 comprises a case 58 in which the circuit board 54 and the means for storing electric power 56 are stored. The case 58 is designed to withstand impacts, deformations. The case 58 is tightly closed to protect the circuit board 54 and the means for storing electric power 56 from dust and moisture.

According to a first embodiment that is seen in FIGS. 2 to 6, the case 58 is approximately parallelepipedic and comprises two half-shells 58.1 and 58.2 that, when they are assembled, define a housing in which the circuit board 54 and the means for storing electric power 56 are placed. The two half-shells 58.1 and 58.2 are joined by any appropriate means, such as, for example, screws.

When the saddle 14 is strapped onto a horse 10, the half-shell 58.1 corresponds to the upper half-shell, and the half-shell 58.2 corresponds to the lower half-shell.

Preferably, the circuit board 54 and/or the means for storing electric power 56 are immobilized relative to the case 58 by any appropriate means. According to an embodiment, the circuit board 54 is attached to the interior surface of one of the half-shells 58.1 using screws.

According to the first embodiment, as illustrated by FIG. 6, the case 58 is connected to the saddle-tree 20 by interlocking. This design makes it possible to obtain a thorough connection between the case 58 and the saddle tree 20 without a connecting element.

According to one design, the case 58 is positioned in the area of the opening 36, in the vicinity of the pommel 18.

Preferably, the case 58 comprises two wings 60.1 and 60.2 placed on both sides of the case 58, symmetrically in relation to the vertical longitudinal plane PMV. Each wing 60.1 and 60.2 comprises a first end connected to the case 58 and a second free end 62 designed to work with the concave profile 42 of the peripheral edge 38 of the opening 36 of the saddle-tree 20. The wings 60.1 and 60.2 and the concave profiles 42 are sized so that the second ends 62 are immobilized between the bulges 44, 44' and so that the case 58 is immobile in a direction parallel to the axis Z.

Advantageously, the wings 60.1 and 60.2 are designed so that the distance between the second ends 62 of the wings 60.1 and 60.2 is very slightly greater than the maximum distance (in a transverse plane) separating the two concave profiles 42 of the peripheral edge 38. Thus, the case 58 is forcibly inserted between the two concave profiles 42.

Preferably, the second ends 62 each comprise a rectilinear generatrix 63 (which is seen, for example, in FIG. 5), parallel to the axis X when the case 58 is mounted on the saddle-tree. According to an embodiment, each rectilinear generatrix 63 has a length greater than 1 cm. This design makes possible a better hold of the case 58, the latter no longer being able to pivot around the axis Z when it is inserted between the two concave profiles 42. According to this design, to secure the case 58 to the saddle-tree, the case 58 is introduced into the opening 36, pivoted along the axis Z, and it is immobilized relative to the saddle-tree 20 by making it pivot so that the rectilinear generatrices 63 of the second ends 62 are oriented parallel to the axis X and cooperate with the concave profiles 42.

According to an embodiment, each wing 60.1 and 60.2 is inclined downward so that the second end 62 is offset toward the horse relative to the first end when the case 58 is incorporated into the saddle 14 and when the saddle is strapped onto the horse. This design strengthens the bond between the case 58 and the saddle-tree 20 and makes it possible to offset the case 58 upward to disengage the part between the lateral bands 28, as illustrated in FIG. 6.

According to the first embodiment, the saddle 14 comprises at least one connector 64 that is connected to the electronics device 52 and that is accessible from the outside of the saddle 14.

According to a design, the saddle 14 comprises a single connector 64 placed at the rear of the saddle 14, in the area of the cantle 34.

In addition to the connector 64, the saddle 14 comprises at least one wire 66, generally a bundle of wires, which connects the connector 64 to the electronics device 52. For the rest of the description, the term wire 66 is used to designate both a wire and a bundle of wires.

Advantageously, the wire 66 comprises at least two segments: a first segment 66.1 connected to the electronics device 52 and a second segment 66.2 connected to the connector 64, the segments 66.2 being connected to one another by a mating connector 68.

According to this concept, it is possible to incorporate the connector 64 into the cantle 34 during the manufacture of the saddle-tree 20, prior to the placement of the covering. The electronics device 52 is incorporated into the saddle 14 after the placing of the covering on the upper surface of the saddle-tree 20, just before the placing of the covering that covers the lower surface of the saddle-tree 20. The electronics device 52 is then connected to the connector 64 by joining the mating connector 68.

This concept makes it possible to incorporate the electronics device 52, which is a sensitive element, at the end of the process of manufacturing the saddle 14. Moreover, it makes it possible to simplify access and removal of the electronics device 52 for maintenance operations.

In terms of function, the connector 64 is used to recharge the means for storing electric power 56, to modify the program or programs used in the circuit board 54. Of course, the connector 64 is not limited to these functions.

According to an embodiment, the means for storing electric power 56 comprises batteries.

The circuit board 54 comprises at least one memory for storing data, at least one means for computing and processing data, a timing mechanism, a communications system, and at least one sensor 50. According to an embodiment, the circuit board 54 comprises at least one central processing unit (microprocessor) that ensures the functions of storage of data, computing and processing of data, and timing.

According to a second embodiment that is seen in FIGS. 7 to 11, the sensor or sensors 50 is/are placed in a secured case 100 that is connected by a thorough connection to the saddle-tree 20.

According to a design, the secured case 100 is secured by any appropriate means (screwing, gluing, or the like) onto the lower surface of the arch 24 in the area of the pommel. Thus, according to this second embodiment, the sensor or sensors 50 is/are directly connected to the saddle-tree 20. By way of example, the sensors 50 are incorporated into a circuit board that is connected rigidly to the secured case 100 that is itself rigidly connected to the saddle-tree 20. The zone under the arch in the area of the pommel is a protected location that makes it possible to limit the stresses on the secured case 100.

At least one part of the electronics device 52 is placed in the secured case 100.

According to this second embodiment, the saddle 14 comprises a removable case 102 in which at least one means for storing electric power 56 is stored. This design makes it possible to withdraw the removable case 102 to be able to recharge the means for storing electric power 56. Thus, the saddle 14 does not need to be moved to recharge them.

The secured case 100 and the removable case 102 are connected by at least one wire connection that comprises a connector 104. This connector 104 is designed to make possible a quick and simple connection between the secured case 100 and the removable case 102.

Advantageously, in addition to the means for storing electric power 56, the removable case 102 comprises a microprocessor and at least one communication system. Preferably, the removable case 102 comprises a connector, similar to the connector 64 used to recharge the means for storing electric power 56, to modify the program or programs used in the microprocessor, a circuit board, the communication system.

According to the second embodiment, the rear part of the saddle-tree 20, and particularly its cantle 34, comprises a housing 106 designed to receive the removable case 102.

The cantle 34 comprises a pad 108 made of polyurethane for example, secured to the upper surface of the curved rear portion 30 of the bar 26.

This pad 108 comprises a cavity so as to form the housing 106 with the upper surface of the curved rear portion 30 of the bar 26.

Advantageously, the cantle 34 comprises a rigid shell 110 that forms the housing 106. This rigid shell 110 is secured rigidly to the upper surface of the curved rear portion 30 of the bar 26. Thus, the housing 106 is delimited by rigid walls, namely the rigid shell 110 and a portion of the bar 26. The rigid shell 110 has an inverted U shape in transverse planes and a height that increases from front to rear. Thus, the rigid shell 110 comprises an upper surface 110.1 and two lateral surfaces 110.2 and 110.3.

Figure 7:
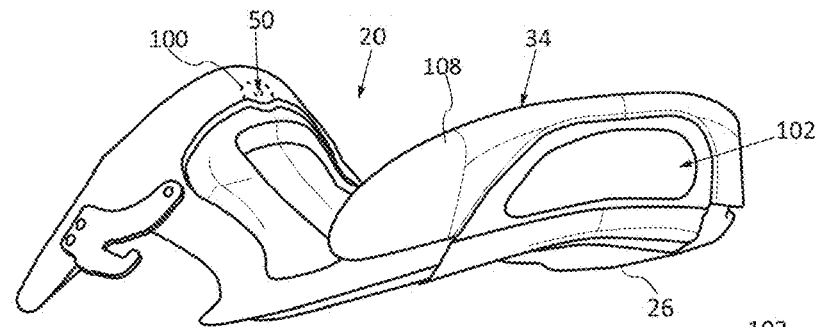
FIG. 7 is a view in perspective from the rear of the saddle-tree that illustrates another embodiment of the invention, in the inserted state.
Figure 8:
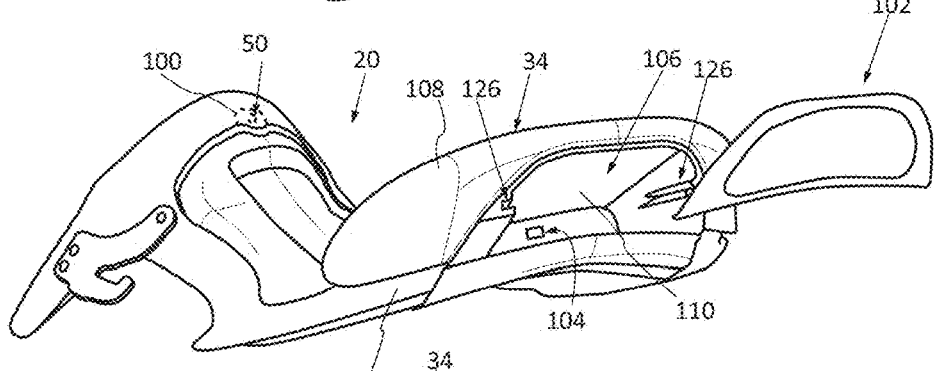
FIG. 8 is a view in perspective from the rear of the saddle-tree that is seen in FIG. 7, in the withdrawn state.
Figure 9:
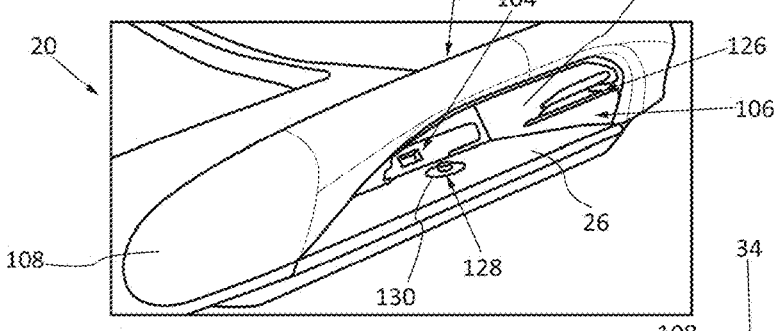
FIG. 9 is a view in perspective of a housing placed in the area of the cantle.

According to this second embodiment, the removable case 102 is designed to deal with an inserted state as illustrated in FIG. 7 and a withdrawn state as illustrated in FIG. 8.

The connector 104 comprises a first part 112 that is integral with the rigid shell 110 and a second part 114 that is integral with the removable case 102, the first and second parts 112 and 114 being designed to be plugged into one another automatically when the removable case 102 is moved in translation in an insertion direction until the inserted state is reached.

Figure 11:
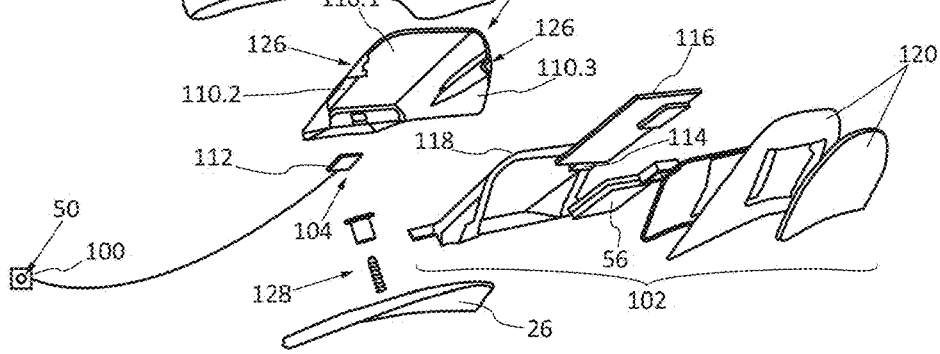
FIG. 11 is a view in perspective illustrating in an exploded view the different elements of the cantle of the saddle-tree that is seen in FIG. 7.

According to a design that is seen in FIG. 11, the removable case 102 comprises, on the inside, a circuit board 116 secured to the removable case 102, which incorporates the microprocessor and the communication system and which has a plug that forms the second part 114 of the connector 104. This plug extends through the removable case 102 to protrude to the outside of the removable case 102 that is sealed.

According to the second embodiment, the removable case 102 comprises two rigid half-shells 118 and 120, assembled by any appropriate means such as screws, for example.

One of the two half-shells 120 forms a rear panel that is designed to close the housing 106 when the removable case 102 is in the inserted state and when the first and second parts 112 and 114 of the connector 104 are connected.

Figure 10:
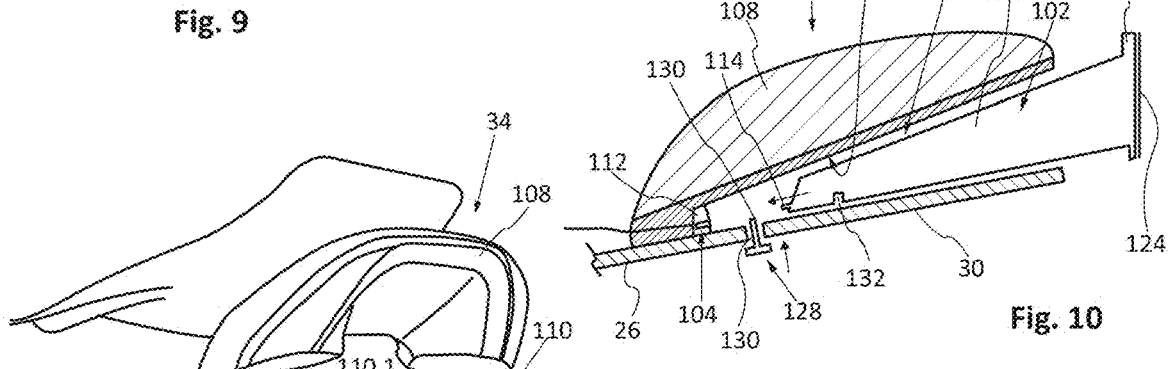
FIG. 10 is a section of a cantle that illustrates the insertion of a case into a housing provided in the cantle area.

To increase the autonomy of the means for storage of electric power 56, the half-shell 120 of the removable case 102 comprises, on its outside surface (which is seen when the removable case is in the inserted state), at least one photovoltaic panel 124 (which is seen in FIG. 10) to produce electric power and to recharge the means for storing electric power 56.

Advantageously, a guide system 126 is provided to guide the removable case 102 during its insertion into the housing 106. This guide system 126 comprises two slides parallel to the direction of insertion, placed on both sides of the removable case 102. By way of example, grooves are provided on each lateral face 110.2 and 110.3 of the rigid shell 110, into which ribs provided on both sides of the removable case 102 slide. The guide system 126 makes it possible to position the removable case 102 correctly in its housing 106 and facilitates the connection of the first and second parts 112, 114 of the connector 104.

Preferably, the saddle-tree 20 comprises a locking system 128 to hold the removable case 102 in the inserted state and to keep the first and second parts 112, 114 of the connector 104 connected.

By way of example, the locking system 128 comprises a pin 130 that is designed to fit into a hole 132 made in the removable case 102 and that is positioned in the area of the curved rear portion 30 of the bar 26. The pin 130 is designed to occupy a locked state in which the pin 130 is housed at least partially in the hole 132 of the removable case 102 and an unlocked state in which the pin 130 is positioned outside of the hole 132. According to a design, the pin 130 is mobile in translation in a direction perpendicular to the direction of insertion.

The locking system comprises a spring to push the pin 130 into the locked state.

The pin 130 passes through the bar 26 and comprises a first end designed to work with the hole 132 of the removable case 102 and protruding above the curved rear portion 30 of the bar 26 in the locked state and a second end that can be accessed from below the curved rear portion 30 of the bar 26.

Advantageously, to facilitate the actuation of the pin, the second end comprises a tab that can be gripped, making it possible to pull on the pin 130 against the spring so as to hold the pin in the unlocked state to be able to withdraw the removable case 102.

Whatever the embodiment, the communication system is designed to operate with at least one communication protocol such as "Wifi," "Bluetooth," GSM, or the like.

According to an embodiment, the communication system operates with the "Bluetooth" protocol to communicate with a mobile device 70 such as a portable telephone, a smartphone, a tablet, a computer or the like placed in the vicinity of the saddle 14.

Whatever the variant, the electronics device 52 is paired with a mobile device 70 by a communication system to make it possible for them to exchange data or information.

The electronics device 52 comprises at least one program used in the central processing unit. Preferably, the electronics device 52 comprises a first program to process the data coming from the sensor or sensors 50 and a second program designed to make the various elements present on the circuit board 54 operate and to manage the means for storage of electric power 56.

The electronics device 52 is designed to detect at least one jump of the horse.

According to a first variant, the electronics device 52 comprises at least a first sensor to measure a characteristic of the movement of rotation around the axis Y.

Figure 12:
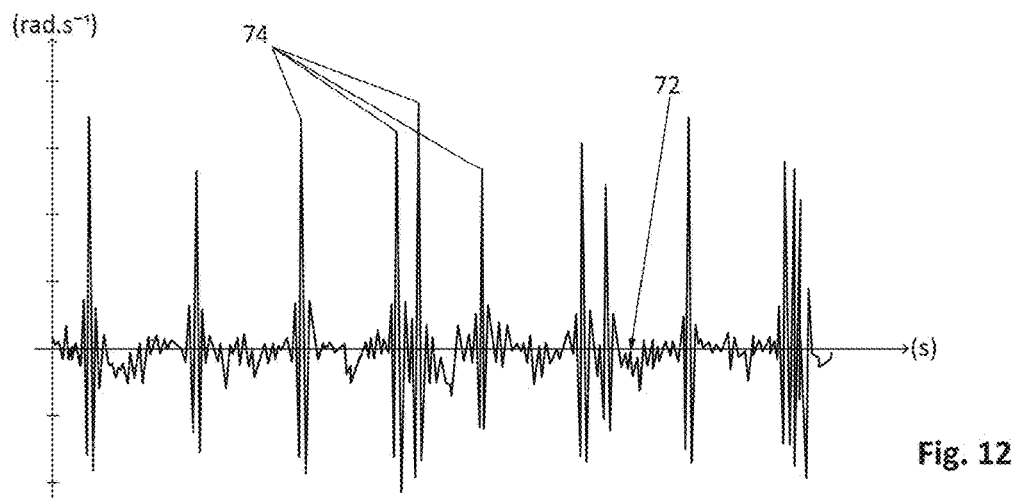
FIG. 12 shows a curve obtained from the measurements of a gyroscope that illustrates a means for identifying a jump.

According to an embodiment, the circuit board 54 comprises a gyroscope designed to measure a speed of rotation around the axis Y. The data measured by the gyroscope make it possible to obtain a curve 72 as illustrated in FIG. 12 that represents an angular speed (expressed in radians per second) as a function of time (expressed in seconds). According to an embodiment, the peaks are filtered with a low-pass filter and a cutoff frequency of 1 Hz.

In addition to the gyroscope, the first program used in the electronics device 52 is designed to identify at least one peak 74 on the curve 72, each peak 74 corresponding very probably to a jump.

Figure 13:
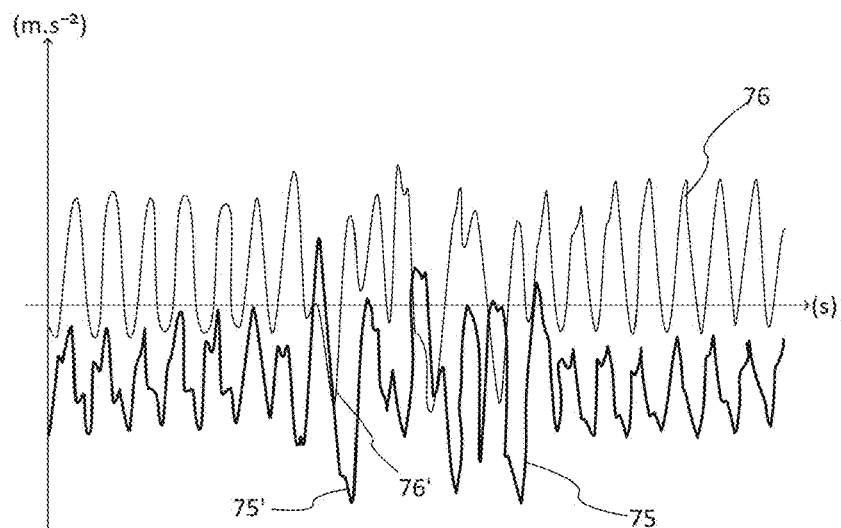
FIG. 13 shows two curves obtained from the measurements of two accelerometers that illustrate a means for identifying a jump.

According to a second variant, the electronics device 52 comprises at least a second sensor to measure an acceleration along the axis X and an acceleration along the axis Z. According to an embodiment, the circuit board 54 comprises a first accelerometer designed to measure an acceleration along the axis X and a second accelerometer designed to measure an acceleration along the axis Z. The data measured by the first accelerometer make it possible to obtain a curve 75 (which is seen in FIG. 13) that corresponds to the acceleration along the axis X, and the data measured by the second accelerometer make it possible to obtain a curve 76 (which is seen in FIG. 13) that corresponds to the acceleration along the axis Z. Each curve 75 and 76 represents an acceleration (expressed in $m \cdot s^{-2}$) as a function of time (expressed in seconds).

In addition to the accelerometers along the axes X and Z, the first program used in the electronics device 52 is designed to identify irregularities 75' and 76' respectively on the curves 75 and 76, one jump corresponding to an irregularity 76' on the curve 76 followed by an irregularity 75' on the curve 75.

Advantageously, the electronics device 52 combines the first and second variants and comprises at least one sensor for measuring a characteristic of the movement of rotation around the axis Y and at least one other sensor for measuring an acceleration along the axis X and an acceleration along the axis Z, a jump being identified at each peak of the speed of rotation around the axis Y and as a result of the irregularities of the accelerations along the axes X and Z.

Of course, the invention is not limited to these sensors. Thus, the electronics device 52 can comprise a positioning sensor that makes it possible to determine the trajectory of the horse or any other sensor that makes it possible to identify at least one characteristic of the movement of the horse, at least one physiological characteristic of the horse, or any other characteristic relative to the horse and/or the rider.

According to another characteristic of the invention, the data collected by the electronics device 52 are transmitted to a remote platform 78 that lists all of the data transmitted by the electronics devices 52 incorporated into different saddles. This solution makes it possible to consolidate at the same point all of the data collected to, inter alia, refine the algorithms that ensure the processing of the collected data.

According to a first embodiment, the data collected are transmitted directly by the electronics device 52 to the platform 78. In this case, the electronics device 52 comprises a smartcard of the GSM type, making it possible to transmit the data via the telecommunications networks or via the Internet.

According to another embodiment, the data collected are transmitted by the electronics device 52 to a mobile device 70 by using a short-range communication protocol such as "Bluetooth," for example. As a second step, the data collected are transmitted by the mobile device 70 to the platform 78 via the telecommunications networks or via the Internet.

The object of the invention is also to propose a method for synchronizing data collected during a course by the electronics device 52 that is incorporated into the saddle 14 with a video of the course.

For this purpose, a mobile device 70 equipped with a photographing system 80 is used to photograph the course and to obtain a video of the course.

In addition to the photographing system 80, this mobile device 70 comprises a means for storing at least one video, a clock that establishes a first time mark and a communications system to pair it to the electronics device 52 that is incorporated into the saddle 14 of the horse 10 executing the course.

The mobile device 70 also comprises an application that makes it possible, inter alia, to transmit a signal for synchronization with the electronics device 52. According to an embodiment, the application comprises at least one command that when it is activated, triggers the transmission of the synchronization signal in the form of a pulse, for example. The time of sending of the synchronization signal is known from the first time mark of the clock of the mobile device 70. This synchronization signal received by the electronics device 52 virtually simultaneously to the sending indicates a time origin in a second time mark linked to the timing mechanism of the electronics device 52. Thus, the second time mark of the electronics device 52 is synchronized with the first time mark of the mobile device 70.

Since the beginning and end of the video are known from the first time mark, the timing of the taking of measurements of each piece of data collected is known in relation to the time origin of the second time mark, the timing of the time origin is known from the first time mark as a result of the synchronization signal, and the data collected are then synchronized to the video.

According to a first operating mode, the command for triggering the beginning of the video corresponds to the command for transmission of the synchronization signal.

According to a second operating mode, the application used in the mobile device 70 comprises a dedicated synchronization command that is activated before the command for triggering the beginning of the video. Thus, in this case, after the pairing of the electronics device 52 with the mobile device 70, a user who desires to film a course and to display in a synchronized manner at least one piece of information determined from data collected by the electronics device 52 launches the application and activates the synchronization command. Upon receipt of the synchronization signal, the electronics device 52 triggers the collection of data. Subsequently, the user triggers the beginning of the video.

Advantageously, when the command for stopping the photographing is activated, a signal for stopping the taking of measurements is transmitted to the electronics device 52 by the mobile device 70. Upon receipt of this stop signal, the electronics device 52 stops the collection of data. As a variant, the application comprises two commands: a first command for stopping the photographing and a second command for stopping the taking of measurements. As a variant, the synchronization signal can be transmitted by the electronics device in the direction of the mobile device 70.

Whatever the operating mode, the method of synchronizing a video obtained from a mobile device 70 with data collected by an electronics device 52 installed on the horse comprises a first step that aims to pair the mobile device 70 and the electronics device 52 and a second step that aims to transmit a synchronization signal between the mobile device 70 and the electronics device 52 in such a way that the time mark of the electronics device 52 and the time mark of the mobile device 70 have a common point.

According to another characteristic, the invention proposes a method of displaying a video 82 of a course on which there can be seen at least one piece of information 84 that is determined from data collected by the electronics device 52 during the course, this piece of information 84 changing over time, all along the course.

By way of example, the piece of information 84 displayed simultaneously with the video 82 of the course comprises data relating to the strides (length, consistency), to the jumps (lift, symmetry of the lift, landing, . . . ). Of course, the invention is not limited to these pieces of information.

Figure 14:
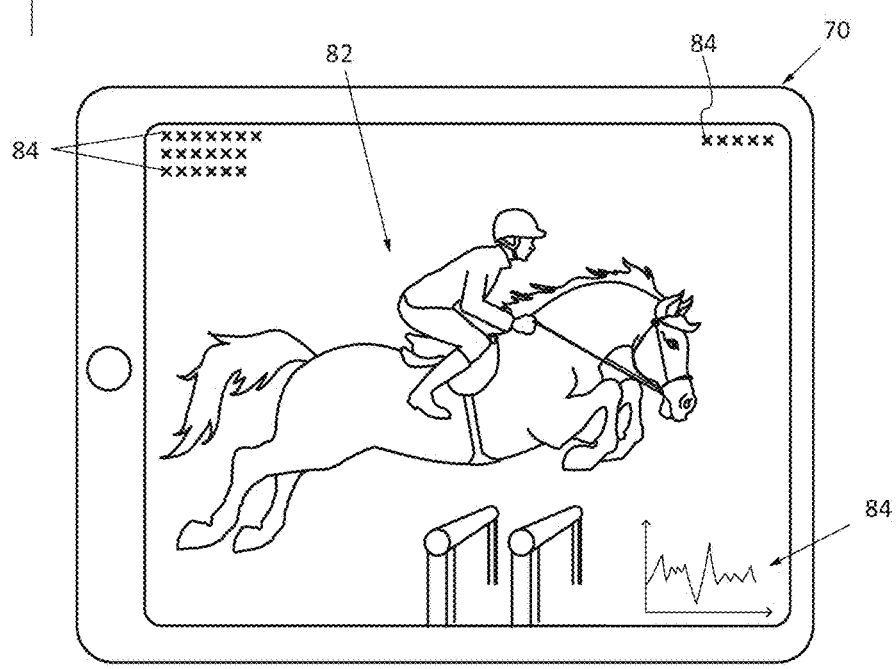
FIG. 14 is a view of a display device that makes it possible to display a video on which data is displayed concerning the characteristics of the horse and/or the rider.

As illustrated in FIG. 14, the video 82 displays several pieces of information in different presentation forms (value, diagram, or the like).

According to the invention, the display method comprises, in addition to the steps of photographing, taking measurements and synchronization described previously, a step for determining the values of the pieces of information 84 from the flow of collected data and another step for editing that aims to overlay on at least certain images of the video 82 the value of the piece of information 84 that corresponds to each of these images.

According to an operating mode, the application used in the mobile device 70 has computing means that are sufficient to determine for at least some images of the video 82 the corresponding piece of information 84 from the collected data and to perform the editing.

According to another operating mode, the video and the data collected are transmitted to the platform 78 that determines—for at least some images—the corresponding piece of information 84 from the collected data and performs the editing. After editing, the video 82 with the piece of information 84 is transmitted to the mobile device 70 or another mobile device 70' to make it possible for a user to display a video of the course, the values of the pieces of information 84 that are seen on the video 82 being synchronized to the images of the video.

To reduce the size of the video files and of the flow of data transmitted to the platform 78, the video and the flow of collected data are resized as a function of the first jump and the last jump of the course.

The times of the first jump and of the last jump are determined from the data collected by the electronics device as previously explained, particularly from data collected by the gyroscope along the axis Y and by the accelerometer(s) along the axes X and Z.

According to an embodiment, the video and the flow of collected data are resized so that the beginning corresponds to a determined number of strides before the first jump and the end to a determined number of strides after the last jump. By way of example, the beginning corresponds to five strides before the first jump and the end to five strides after the last jump.

In some cases, the frequency of the photographing is different from the frequency of the taking of measurements. Generally, the frequency of the taking of measurements is greater than the frequency of the photographing. In this case, the method of displaying comprises a resampling step that aims to select for each image of the video the corresponding collected data from among the flow of collected data.

The invention claimed is:
1. A horse riding saddle comprising:
   a saddle-tree (20) placed within a covering that covers the saddle-tree (20), said saddle-tree (20) having an arch (24) that forms a pommel (18), a bar (26) that has two lateral bands (28), a curved rear portion (30) that connects rear ends of the two lateral bands (28) and supports a cantle (34), front ends of the two lateral bands (28) being connected to the arch (24),
wherein the arch (24) and the bar (26) form an opening (36) bounded by a peripheral edge (38), and
at least one sensor (50) being fixed under a centralmost portion of the arch (24) onto a lower surface of the centralmost portion of the arch (24) in a central longitudinal and vertical plane (PMV) of the saddle-tree (20) extending along and passing through an axis corresponding to an axis of a spinal column of the horse having the riding saddle mounted thereon, the at least one sensor (50) being connected to the saddle-tree (20) by a thorough connection under the arch (24) of the saddle-tree (20) with the at least one sensor (50) being immobile in relation to the saddle-tree (20),
a fixed case (100) containing the at least one sensor (50), the fixed case being attached to the saddle-tree (20) under the arch (24) of the saddle-tree (20), the fixed case (100) having a length less than a shortest distance between the two lateral bands (28) as defined by a line passing through the fixed case (100),
the at least one sensor (50) not being connected to the covering of the saddle,
the thorough connection being in the central longitudinal and vertical plane (PMV) of the saddle-tree (20) extending along and passing through the axis corresponding to the axis of a spinal column of the horse having the riding saddle mounted thereon.

2. The horse riding saddle according to claim 1, wherein the saddle (10) comprises:
a removable case (102) containing at least one means for storing electric power (56),
a housing (106) placed in an area of the cantle (34) and designed to receive the removable case (102), and
at least one wire connection connecting the fixed case (100) and the removable case (102), the at least one wire connection having a connector (104).

3. The horse riding saddle according to claim 2, wherein the saddle-tree (20) comprises a rigid shell (110) that forms the housing (106) and wherein the connector (104) comprises a first part (112) that is integral with the rigid shell (110) and a second part (114) that is integral with the removable case (102), the first and second parts (112, 114) being designed to be plugged into one another automatically when the removable case (102) is translated in an insertion direction up to an inserted state of the removable case (102) in the housing (106).

4. The horse riding saddle according to claim 3, wherein the housing (106) is delimited by the rigid shell (110) and the curved rear portion (30) of the saddle-tree, said rigid shell (110) having an inverted U shape with an upper surface (110.1) and two lateral surfaces (110.2, 110.3).

5. The horse riding saddle according to claim 4, wherein the removable case (102) has two opposite sides, and wherein the housing (106) comprises a guide system (126) that has two slides, parallel to the insertion direction, one of the two slides placed on each of the opposite sides of the removable case (102).

6. The horse riding saddle according to claim 4, wherein the saddle-tree (20) comprises a locking system (128) to hold the removable case in the inserted state.

7. The horse riding saddle according to claim 4, wherein the removable case (102) comprises at least one photovoltaic panel (124).

8. The horse riding saddle according to claim 3, wherein the removable case (102) has two opposite sides, and wherein the housing (106) comprises a guide system (126) that has two slides, parallel to the insertion direction, one of the two slides placed on each of the opposite sides of the removable case (102).

9. The horse riding saddle according to claim 8, wherein the saddle-tree (20) comprises a locking system (128) to hold the removable case in the inserted state.

10. The horse riding saddle according to claim 8, wherein the removable case (102) comprises at least one photovoltaic panel (124).

11. The horse riding saddle according to claim 3, wherein the saddle-tree (20) comprises a locking system (128) to hold the removable case in the inserted state.

12. The horse riding saddle according to claim 11, wherein the locking system (128) comprises a pin (130) that is mobile in relation to the saddle-tree (20) and a hole (132) made in the removable case (102), the pin (130) being designed to occupy a locked state in which the pin (130) is housed at least partially in the hole (132) of the removable case (102) and an unlocked state in which the pin (130) is positioned outside of the hole (132).

13. The horse riding saddle according to claim 12, wherein the locking system comprises a spring to hold the pin (130) in the locked state.

14. The horse riding saddle according to claim 13, wherein the pin (130) passes through the bar (26) and comprises a first end designed to work with the hole (132) of the removable case (102) and protruding above the curved rear portion (30) of the bar (26) in the locked state and a second end that can be accessed from below the curved rear portion (30) of the bar (26).

15. The horse riding saddle according to claim 3, wherein the removable case (102) comprises at least one photovoltaic panel (124).

16. The horse riding saddle according to claim 2, wherein the removable case (102) comprises at least one photovoltaic panel (124).

17. The horse riding saddle according to claim 1, wherein the saddle comprises at least a first sensor to measure a characteristic of movement of rotation around a horizontal axis (Y) and that is perpendicular to a longitudinal direction of the saddle.

18. The horse riding saddle according to claim 17, wherein the saddle comprises at least a second sensor to measure an acceleration along a horizontal axis (X) and parallel to the longitudinal direction of the saddle and an acceleration along a vertical axis (Z) perpendicular to the horizontal axis (X).

19. The horse riding saddle according to claim 1, wherein the length of the case is less than a smallest length of the opening (36) defined by a line extending between opposite parts of the peripheral edge (38) of the opening (36) and passing through the central longitudinal and vertical plane (PMV) of the saddle-tree (20).

20. The horse riding saddle according to claim 1, further comprising a circuit board rigidly connected to the fixed case (100), the at least one sensor (50) being incorporated into the circuit board.

* * * * *